(12) United States Patent
Ishibashi et al.

(10) Patent No.: US 7,404,852 B2
(45) Date of Patent: Jul. 29, 2008

(54) INKJET INK, INKJET RECORDING METHOD, METHOD OF EVALUATING INKJET INK, AND METHOD OF MANUFACTURING INKJET INK

(75) Inventors: Mitsuru Ishibashi, Yokohama (JP); Toru Ushirogochi, Yokohama (JP); Kazuhiko Ohtsu, Mishima (JP); Ryozo Akiyama, Mishima (JP); Masashi Hiroki, Yokohama (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

(21) Appl. No.: 11/522,554

(22) Filed: Sep. 14, 2006

(65) Prior Publication Data

US 2007/0006773 A1 Jan. 11, 2007

Related U.S. Application Data

(63) Continuation of application No. PCT/JP2005/010808, filed on Jun. 13, 2005.

(51) Int. Cl.
*C09D 11/02* (2006.01)

(52) U.S. Cl. .................................. 106/31.65

(58) Field of Classification Search .............. 106/31.65
See application file for complete search history.

(56) References Cited

U.S. PATENT DOCUMENTS

| | | | |
|---|---|---|---|
| 6,110,266 A | 8/2000 | Gonzalex-Blanco et al. | |
| 6,368,397 B1 * | 4/2002 | Ichizawa et al. | 106/31.65 |
| 6,494,943 B1 * | 12/2002 | Yu et al. | 106/31.65 |
| 2002/0143079 A1 | 10/2002 | Yamanouchi et al. | |
| 2003/0084820 A1 | 5/2003 | Okamoto et al. | |
| 2005/0012796 A1 | 1/2005 | Doi et al. | |
| 2005/0139122 A1 * | 6/2005 | Allen et al. | 106/31.6 |

FOREIGN PATENT DOCUMENTS

| | | |
|---|---|---|
| JP | 07-331147 | 12/1995 |
| JP | 2001-316605 | 11/2001 |
| JP | 2002-129071 | 5/2002 |
| JP | 2003-003095 | 1/2003 |
| JP | 2003-089756 | 3/2003 |
| JP | 2004-131589 | 4/2004 |
| JP | 2004-352856 | 12/2004 |
| JP | 2005-187726 | 7/2005 |
| WO | WO 2006/134633 | 12/2006 |

OTHER PUBLICATIONS

International Search Report re: PCT/JP2005/010808.
Communication from European Patent Office re: related application.
English Translation of International Preliminary Report on Patentability dated Jan. 3, 2008 for PCT/JP2005/010808.

* cited by examiner

*Primary Examiner*—Jerry A. Lorengo
*Assistant Examiner*—Veronica Faison Gee
(74) *Attorney, Agent, or Firm*—Harness, Dickey & Pierce, P.L.C.

(57) ABSTRACT

An inkjet ink is provided, which includes a solvent and a pigment having an average particle diameter of not larger than 250 nm. The number of flocculates of pigment particles having a diameter of 1 μm or more is $1.6 \times 10^8/cm^3$ or less.

5 Claims, 1 Drawing Sheet

INKJET INK, INKJET RECORDING METHOD, METHOD OF EVALUATING INKJET INK, AND METHOD OF MANUFACTURING INKJET INK

CROSS-REFERENCE TO RELATED APPLICATIONS

This is a Continuation Application of PCT Application No. PCT/JP2005/010808, filed Jun. 13, 2005, which was published under PCT Article 21(2) in Japanese.

BACKGROUND OF THE INVENTION

1. Field of the Invention

This invention relates to an inkjet ink, an inkjet recording method, a method of evaluating an inkjet ink, and a method of manufacturing the inkjet ink.

2. Description of the Related Art

In recent years, there has been increasing demands for an inkjet type printer. Namely, it is expected that the inkjet type printer which is high in printing speed and capable of achieving high-quality printing is useful not only as a printer for personal computers in offices and at home but also as a printer for printing a fairly large number of copies of printed matter such as a poster of large scale, a local advertisement bill and an enterprise handout, thus substituting for the conventional printing utilizing a form plate. This inkjet type printer may be considered as being an on-demand printer which is capable of quickly coping with the diversification of needs.

As for the ink to be employed in the inkjet type printer, an aqueous ink using water-soluble dyes has been mainly employed in viewpoint of overcoming the problems of odor and safety. In recent years however, inks employing pigments as a colorant have been proposed in order to improve the quality of printing such as water resistance and light stability. To meet such a proposal, it is now required to control the particle diameter of pigments to be included in the ink and to secure the stability of dispersed state of pigments. If the dispersed state of pigments is instable, the flocculation of pigment particles will occur. In the case of inkjet type printer in particular, the flocculation of pigment particles may trigger the instability in the delivering state of ink. As a result, the rectlinearity in delivery of ink would be degraded, thus generating streak lines and the like on printed matters and hence making it impossible to obtain printing of high quality. In the worst case, there may be a case where the delivery port is clogged on the occasion of delivering ink. There is also the problem that the ink would become poor in long-term storage stability.

In order to solve the aforementioned problems, it is required to control the state of pigment particles. Up to date however, no one has succeeded to find means to directly observe the particles of pigment as well as the flocculation of pigment particles. As for the means conventionally available to obtain the information with regard to the particle diameter of pigments, etc., there have been employed various kinds of particle size-measuring apparatuses where a dynamic light scattering method, a light diffraction scattering method or a laser Doppler method are utilized. However, even with these measuring apparatuses, the particle size to be obtained from these measuring apparatuses is that of the population of the entire sample being measured, so that it has been very difficult to know the size of particle or the quantity of particle, especially that of flocculation which are contained only as a relatively small number. Further, under some circumstances, it is required to dilute a measuring sample on the occasion of measuring the particle size. However, there are possibilities that the state of dispersion of pigment particles when the measuring sample is diluted is not the same as the state of dispersion of pigment particles when the pigment particles exist as they are in an actual ink. It is also tried to observe the state of pigment particles by electronic microscope. In this case however, the measurement is directed not to the state of pigment particles in the ink but to the simple substance of pigment itself. Therefore, there are possibilities that the state of dispersion of pigment particles as measured by electronic microscope is not the same as the state of dispersion of pigment particles when the pigment particles exist as they are in an actual ink. Because of this, it has been very difficult to know not only the particle size of pigment particles and of the aggregate of pigment particles but also the distribution of the particle size thereof.

As for various kinds of ink that have been disclosed up to date, there are known an ink wherein only the range of average particle diameter is regulated, an ink wherein the distributed ratio of pigment particles included in the distribution range is regulated, an ink wherein the volume ratio of distributed pigment particles having a particle diameter of 1 μm or more is regulated, etc. These inks are all formed of an aqueous ink, and, moreover, it is considered difficult to considerably enhance the delivery stability of ink by simply controlling only the average particle diameter of pigment particles or the distribution thereof. Furthermore, even if only the dispersed pigment particles having a particle diameter of 1 μm or more is regulated, it is considered impossible to considerably enhance the delivery stability of ink. Namely, even if only the average particle diameter of pigment particles or the distribution thereof is regulated, it does not lead to the reduction in a sufficient degree of the number of coarse pigment particles. Further, even if it is possible to regulate the volume ratio of the dispersed pigment particles having a diameter of 1 μm or more, it is impossible, according to the conventional methods, to detect the aggregate (secondary particle) of dispersed pigment particles having a diameter of less than 1 μm as well as the flocculate formed of a plurality of secondary particles which are weakly bonded together. Because of these reasons, it has been impossible to sufficiently eliminate the flocculate of pigment particles and to considerably enhance the ink delivery stability.

BRIEF SUMMARY OF THE INVENTION

An object of the present invention is to provide an inkjet ink having pigment particles stably dispersed therein. Another object of the present invention is to provide an inkjet recording method which makes it possible to stably perform the printing of high quality. Further objects of the present invention are to provide a method of evaluating an inkjet ink where pigment particles are stably dispersed as well as a method of manufacturing such an inkjet ink.

According to one aspect of the present invention, there is provided an inkjet ink comprising an organic solvent; and a pigment having an average particle diameter of 250 nm or less, wherein the number of flocculates of pigment particles having a diameter of 1 μm or more is $1.6 \times 10^8/cm^3$ or less.

According to another aspect of the present invention, there is provided an inkjet recording method using a printing head for recording an image on a substrate by intermittently ejecting ink droplets onto the substrate from the printing head, which is characterized in that the aforementioned inkjet ink is fed to the printing head while driving the printing head at a frequency of 4 kHz or more.

According to a further aspect of the present invention, there is provided a method of evaluating an inkjet ink, the method comprising the steps of: dispersing pigment particles having an average particle diameter of 250 nm or less in a solvent to prepare a pigment dispersion; coating the pigment dispersion on an impermeable substrate to prepare a sample to be measured; and observing the sample using a microscope having a confocal optical system; wherein the sample is determined as acceptable provided that the number of pigment flocculate having a diameter of 1 μm or more and included in the sample is $1.6 \times 10^8/cm^3$ or less.

According to a still further aspect of the present invention, there is provided a method of manufacturing an inkjet ink, the method comprising the steps of: dispersing pigment particles having an average particle diameter of 250 nm or less in a solvent to prepare a pigment dispersion; coating a portion of the pigment dispersion on an impermeable substrate to prepare a sample to be measured; observing the sample using a microscope having a confocal optical system; and subjecting the rest of the pigment dispersion to a dispersion treatment, provided that the number of pigment flocculate having a diameter of 1 μm or more exceeds a predetermined evaluation standard which is $1.6 \times 10^8/cm^3$.

BRIEF DESCRIPTION OF THE SEVERAL VIEWS OF THE DRAWING

The single FIGURE is a schematic diagram illustrating a printing apparatus to which the inkjet ink according to one embodiment of the present invention can be applied.

DETAILED DESCRIPTION OF THE INVENTION

Figure 1:
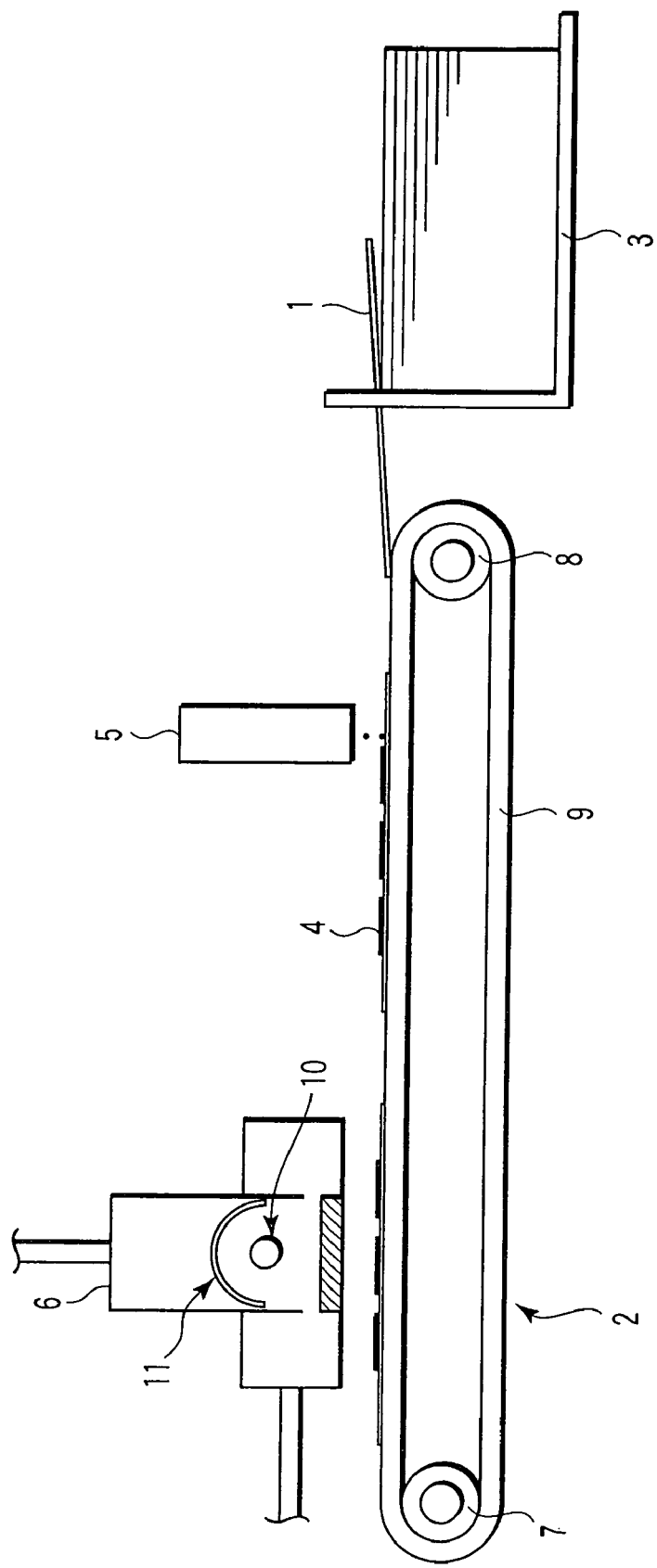

Next, embodiments of the present invention will be explained.

The inkjet ink according to one embodiment of the present invention is a pigment ink comprising pigments dispersed in a solvent and is designed to be delivered from a printing head of inkjet system printing apparatus.

As a result of studies intensively made by the present inventors with regard to the pigment ink, the following findings have been obtained. In the case of printing apparatus employing a pigment ink, the properties of the ink such as the storage stability of ink and the delivery stability of ink are closely related to the dispersed state of pigment particles in the ink. In order to enhance these properties of ink, it is important to control the dispersed state of pigment particles. The factor that influences especially to the delivery stability is the existence of coarse pigment particles in the ink. The coarse pigment particles are formed respectively of an flocculate comprising a plurality of primary particles of pigment which are aggregated with each other. Under some circumstances, a plurality of flocculates are further weakly bonded with each other. Furthermore, the ink may contain weakly bonded flocculates comprising a principle component (solvent) of ink and/or a photopolymerization initiator and pigment particles. The flocculates of this kind may have a size ranging from 1 μm to several tens microns or more and are frequently formed of a gel-like matter or a gel-like suspended matter.

The printing head of inkjet system is accompanied with a problem of ink delivery errors such as delivery failure or linear off-printing due to the existence of flocculates on the occasion of delivering the ink, resulting in the deterioration in quality of printed matter to be obtained. In order to prevent the deterioration in quality of printing, it is desirable to make the particle diameter of flocculate as small as possible. Generally, the particle diameter of flocculate should preferably be ⅓ or less, more preferably about 1/10 or less of the pore size of nozzle of printing head for discharging a liquid ink. This range of pigment particle size corresponds to about 1 to 5 μm if a nozzle of typical type is to be employed. When printing test was performed using an ink containing flocculates of this size, it was confirmed that there was a correlation between the number of pigment flocculates and the frequency of ink delivery error.

If the frequency of delivery error of ink is limited to 5 times or less per printing head per hour, the quality of printed image to be obtained would be sufficiently acceptable. It has been found out by the present inventors that in order to suppress the frequency of delivery error of ink to this range, it is necessary to confine the number of flocculates of pigment particles having a diameter of 1 μm or more to $1.6 \times 10^8/cm^3$ or less. Further, if the average particle diameter of pigment particles is too large, the storage stability of the ink tends to degrade. Therefore, the average particle diameter of pigment particles should be confined to 250 nm or less.

Accordingly, in one embodiment of the present invention, the average particle diameter of pigment particles as well as the number of the flocculates of pigment particles having a diameter of 1 μm or more are regulated to predetermined values, respectively. More preferably, the number of the flocculates of pigment particles having a diameter of 1 μm or more should be confined to $1.6 \times 10^7/cm^3$ or less. Further, the number of the flocculates of pigment particles having a diameter of 5 μm or more should preferably be confined to $1.6 \times 10^6/cm^3$ or less. By limiting the pigment particle size and the number of the flocculates of pigment particles in this manner, it is possible to further enhance the effect of preventing the generation of unrecoverable ink delivery error due to the inclusion of flocculates of large size.

By limiting the average particle diameter of pigment particles to 250 nm or less and, at the same time, by limiting the number of the flocculates of pigment particles having a diameter of 1 μm or more to $1.6 \times 10^8/cm^3$ or less, it is now possible to stably disperse the pigment particles and to obtain an inkjet ink exhibiting greatly enhanced ink delivery stability. With respect to the timing to regulate the number of flocculates of pigment particles as described above in one embodiment of the present invention, it may be executed at any occasion in the course of manufacturing the ink up to the time of feeding the ink to the printer as long as the ink can be kept in a stable state. However, since the number of flocculates of pigment particles may increase with time and the aforementioned problems are raised at the moment of delivering the ink from the printing head, the aforementioned requirements with regard to the number of flocculates should be fulfilled at the moment of feeding the ink to the printer.

Incidentally, the regulation of the pigment particle diameter as described above is more critical in the case of organic solvent type ink rather than the aqueous ink. In particular, it becomes very important and effective in enhancing the ink delivery performance in the case of the photosensitive inkjet ink containing a photopolymerization initiator. The reason for this is due to the fact that in the case of this photosensitive inkjet ink, since the components included therein are highly reactive and complicated in composition, the probability of generating the flocculates of pigment particles tends to become much higher than that of the conventional aqueous ink. Furthermore, the importance of regulating the pigment particle diameter in the photosensitive inkjet ink can be ascribed to the facts that since the photosensitive inkjet ink is mainly employed in business, there are stronger demands for reducing the ratio of ink delivery error as compared with that demanded in printers for non-business use, and that the probability of generating problem in the delivery of ink due to the presence of flocculates of pigment particles is much higher in the case of the photosensitive inkjet ink.

As for the inkjet ink according to one embodiment of the present invention, it is possible to preferably employ a photo-curing ink such as a cationic polymerization UV ink, a radical polymerization UV ink and a combination type ink utilizing these UV inks. Among them, the employment of the cationic polymerization UV ink is more preferable, since it is free from the inhibition of polymerization by oxygen, high in dark reactivity, and strong in tendency to generate flocculates. As for the solvents, pigments and optional photopolymerization initiators which can be included as components of the ink according to the present invention, it is possible to preferably employ especially the components of cationic polymerization UV ink disclosed in JP Patent Application No. 2003-4862, and the components of radical polymerization UV ink and the components of cationic/radical polymerization combined type UV ink disclosed in JP Patent Application No. 2003-201860.

As for the solvents for the cationic polymerization UV ink, it is preferable to employ organic solvents. It is preferable that at least 90% by weight of the organic solvent is a polymerizable monomer, i.e., a compound which is polymerizable in the presence of an acid. Examples thereof include compounds 1000 or less in molecular weight and having a cyclic ether group such as epoxy group, oxetane group and oxorane group; acrylic or vinyl compounds having the aforementioned substituent groups on their side chain; carbonate compounds; low molecular melamine compounds; vinyl ethers; vinyl carbazoles; styrene derivatives; alpha-methylstyrene derivatives; vinyl alcohol esters including esters of vinyl alcohol with acryl or methacryl; and monomers having a cation polymerizable vinyl bond. These compounds may be employed in combination of two or more.

As for the solvents for the radical polymerization UV ink, it is possible to employ those including a solvent which polymerizes in the presence of a radical.

Specifically, it is possible to preferably employ ordinary acrylic compound as well as acrylic compounds having terpenoid skeleton attached to the ester side chain thereof. For example, acrylic compounds disclosed in JP Patent Laid-open Publication (Kokai) 08-82925 (1996) can be suitably employed. As for examples of such acrylic ester compounds, they include ester compounds which can be obtained by epoxidizing the double bond of terpen having an unsaturated linkage and then acrylic acid or methacrylic acid is added thereto, wherein examples of terpen include myrcene, carene, ocimene, pinene, limonene, camphene, terpinolene, tricyclene, terpinene, fenchene, phellandrene, sylvestrene, sabinene, dipentene, bornene, isopregol, carvone, etc.

Alternatively, it is also possible to employ ester compounds to be derived from acrylic acid or methacrylic acid and alcohols originated from terpene such as citronellol, pinocampheol, geraniol, phentyl alcohol, nerol, borneol, linalol, menthol, terpineol, thujyl alcohol, citroneral, ionone, irone, cinerol, citral, pinol, cyclocitral, carvomenthone, ascaridole, safranal, piperithol, menthenemonol, dihydrocarvone, carveol, sclareol, manool, hinokiol, ferruginol, totarol, sugiol, farnesol, patchouli alcohol, nerolidol, carotol, cadinol, lantheol, eudesmol, phytol, etc.

It is also possible to employ acrylic or methacrylic compounds, acrylate or methacrylate monomers, styrene-based monomers, or oligomer compounds having a plurality of vinyl-based polymerizable groups, each of these compounds having, on their ester side chains, a skeleton such as citronellic acid, hinokiic acid, santalic acid, menthone, carvotanacetone, phellandral, pimelitenone, peryl aldehyde, thujone, carone, tagetone, camphor, bisabolene, santalene, zingiberene, caryophyllene, curcumene, cedrene, cadinene, longifolene, sesquibenihene, cedrol, guaiol, kessoglycol, cyperone, eremophilone, zerumbone, campholene, podocarprene, mirene, phyllocladene, totalene, ketomanoyl oxide, manoyl oxide, abietic acid, pimaric acid, neoabietic acid, levopimaric acid, iso-d-pimaric acid, agathene dicarboxylic acid, rubenic acid, carotenoid, pelary aldehyde, piperitone, ascaridole, pimene, fenchene, sesquiterpenes, diterpenes, triterpenes, etc.

Any of the monomer materials described above can be generally employed as long as they are capable of exhibiting a sufficient fluidity at ordinary temperatures. For example, it is possible to employ polyacrylate compounds of polyhydric alcohol compounds, polyacrylate compounds of polyhydric aromatic alcohols, polyacrylate compounds of polyhydric alicyclic alcohols, and styrene compounds having a substituent group. As for the examples of such monomers, they include, for example, di- or polyacrylate compounds of ethylene glycol, polyethylene glycol, propylene glycol, glycerin, neopentyl alcohol, trimethylol propane, pentaerythritol, vinyl alcohol-based oligomers; di- or polyacrylate compounds of phenol, cresol, naphthol, bisphenol, novolac-based condensation compounds of these aromatic compounds, and vinyl phenolic oligomers; and di- or polyacrylate compounds of hydrogenated cyclohexane, hydrogenated bisphenol, decahydronaphthalene alicyclic compounds, and di- or polyhydroxyl compounds of terpene-based alicyclic compounds, dicyclopentane or tricyclodecane-based alicyclic compounds.

The content of the aforementioned compounds should preferably be confined within the range of 10% to 40% by weight based on a total weight of inkjet ink. If this content is too small, it would be impossible to expect a sufficient effect thereof. On the other hand, if the content is too large, the viscosity of the ink may increase excessively, thus making it difficult to discharge the ink satisfactorily.

As for the pigments, there is not any particular limitation and hence any kinds of pigments can be employed as long as they are capable of developing desired optical coloring and tinting features. The pigments may be further provided with other properties such as magnetism, fluorescence, conductivity, dielectric property, etc., in addition to the coloring and tinting properties. If the pigments are provided with these various properties, it may become possible to obtain an image having various functions. Further, the pigments may contain particles which are effective in providing an ink layer with increased heat resistance or physical strength.

As for the examples of pigments, they include photoabsorption pigments for example. Examples of such photoabsorption pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments, for example, dye chelate; nitro pigments; aniline black; nitroso pigments such as naphthol green B; azo pigments (including azo lake, insoluble azo pigment, condensed azo pigment, chelate azo pigment) such as Bordeaux 10B, Lake red 4R and chromophthal red; Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridone pigment; quinacridine pigment and isoindolinone pigment.

As for the pigments that can be employed in a black ink, examples thereof include carbon black such as Raven 5750, Raven 5250, Raven 5000, Raven 3500, Raven 1255 and Raven 700 (Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (Cabot Co., Ltd.); No. 2300, No. 900, MCF88, No. 33, No. 40, No. 45, No. 52, MA7, MA8, MA100 and No. 2200B (Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (Degussa Co., Ltd.).

As for the pigments that can be employed in a yellow ink, examples thereof include Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114 and C.I. Pigment Yellow 180. Among these yellow pigments, Pigment Yellow 180 is more preferable since this yellow pigment is excellent in resistance to discoloration caused by an acid.

As for the pigments that can be employed in a magenta ink, examples thereof include C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1 and C.I. Pigment Red 112.

Further, as for the pigments that can be employed in a cyanine ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60.

Further, it is also possible to employ white pigments such as natural clay, metal carbonates such as white lead, zinc white and magnesium carbonate; metal oxides such as barium oxide and titanium oxide. The inkjet ink containing white pigments can be employed not only in white printing but also in the amendments of printing or underlying images through overwriting.

As for fluorescent pigments, it is possible to employ either inorganic fluorescence materials but also organic fluorescence materials. As for the inorganic fluorescence materials, examples of which include $MgWO_4$, $CaWO_4$, $(Ca,Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, and inorganic acid salts such as tungstenate and sulfate. As for the organic fluorescence materials, examples of which include acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galactoside, dansyl tolidine, dansyl chloride derivatives such as dansyl chloride, diphenyl hexatriene, eosin, ε-adenosine, ethidium bromide, fluorescein, foamycine, 4-benzoylamide-4'-aminostilbene-2,2'-sulfonic acid, β-naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl) aminonaphthalene-1-sulfonic acid, 5-iodoacetamide fluorescein, N-(1-anilinonaphthyl 4) maleimide, N-(7-dimethyl-4-methylcumanyl) maleimide, N-(3-pyrene) maleimide, eosin-5-iodoacetamide, fluorescein mercury acetate, 2-[4'-(2''-iodoacetamide)]aminonaphthalene-6-sulfonic acid, eosin, Rhodamine derivatives, organic EL dye, organic EL polymer, organic EL crystal and dendrimer.

The content of the pigments should preferably be confined within the range of 1 to 25% by weight per 100% by weight of the ink. If the content of the pigments is less than 1% by weight, it may become difficult to secure a sufficient color density. On the other hand, if the content of the pigments is higher than 25% by weight, the discharging property of the ink would be degraded. More preferably, the content of the pigments in the ink should be confined within the range of 2 to 8% by weight.

As for the powder to be employed for enhancing the heat resistance and physical strength of ink layer, examples of which include oxides or nitrides of aluminum and silicon, filler and silicon carbide. For the purpose of providing the ink layer with electric conductivity, the ink may further contain conductive carbon pigment, carbon fiber, or powder of copper, silver, antimony and other noble metals. Iron oxide powder and ferromagnetic powder are suited for providing the ink layer with magnetic property. It is also possible to incorporate metal oxide powder such as tantalum oxide or titanium oxide exhibiting high dielectricity into the ink.

The content of the powder in the ink should preferably be confined within the range of 1 to 50% by weight. If the content of the powder components is less than 1% by weight, it would become difficult to expect sufficient effects of enhancing the sensitivity of the ink. On the other hand, if the content of the powder components is higher than 50% by weight, the resolution and sensitivity of the ink would be degraded.

The inkjet ink according to one embodiment of the present invention can be prepared by dispersing pigments in a solvent and by subjecting the resultant mixture to a dispersion treatment using a dispersing machine. As for the dispersing machine, those commonly employed are useful. Examples of the dispersing machine include, among others, a sand mill, a ball mill, a roll mill and an ultrasonic dispersing machine. It is also possible to employ a media-less dispersing machine. In the dispersing treatment, a dispersant may be added to the ink so as to enhance the dispersing efficiency of pigments. As for the dispersant, it is possible to employ, for example, nonionic or ionic surfactants and antistatic agents. Further, it is also possible to employ polymer type dispersants such as acryl and vinyl alcohol. Although the content of the dispersants may be suitably determined depending on the kinds of pigments and on the solvents, the content of the dispersants may generally range from 20 to 70% by weight based on the quantity of pigments.

If a metal salt organic compound such as metal soap is employed as a surfactant incorporated in the inkjet ink, flocculates of relatively large size having a particle diameter of several microns or more tend to be created. Therefore, the employment of metal salt organic compounds is not preferable. If such a compound is to be employed as a surfactant, the content thereof should be confined to not more than several % at most, more preferably 1% or less. If the content of aforementioned metal salt exceeds several %, there will be ordinarily recognized a correlation that the number of flocculates having a particle diameter of 5 μm or more exceeds $1.6 \times 10^6/cm^3$.

When the mixture that has been subjected to the dispersion treatment is classified by using a filter or a centrifugal separator, the number of flocculates of pigment particles having a particle diameter of 1 μm or more can be further minimized.

In the inkjet ink prepared in this manner, a total content of solid matters such as pigments and dispersing agents or powder to be incorporated for additionally providing the ink with various functions should preferably be not less than 3% by weight. If this total content is less than 3% by weight, the concentration of ink may become insufficient or the functions to be additionally provided by the solid matters may become insufficient, thus rendering the ink insufficient in function.

Further, the viscosity of the ink at ordinary temperature should preferably be confined to the range of 6 to 50 mPa·sec. If the viscosity of the ink is higher than 50 mPa·sec, it may become difficult to satisfactorily deliver the ink from the recording head of inkjet printing apparatus. Incidentally, since the storage stability of the ink is degraded or the delivery stability of the ink from the recording head is degraded if the viscosity of the ink is excessively low, the lower limit of the viscosity of the inkjet ink should preferably be about 6 mPa·sec in general.

The inkjet ink according to one embodiment of the present invention may further comprise a photopolymerization initiator.

Examples of the photopolymerization initiator include compounds which are capable of generating an acid as they are irradiated with light (photo-acid generating agents) such as onium salt, diazonium salt, quinone diazide compounds, organic halide compounds, aromatic sulfonate compounds, bisulfone compounds, sulfonyl compounds, sulfonate compounds, sulfonium compounds, sulfamide compounds, iodonium compounds, sulfonyl diazomethane compounds and mixtures of these compounds.

Specific examples of the aforementioned compounds include triphenylsulfonium triflate, diphenyliodonium triflate, 2,3,4,4-tetrahydroxybenzophenone-4-naphthoquinone diazide sulfonate, 4-N-phenylamino-2-methoxyphenyl diazonium sulfate, 4-N-phenylamino-2-methoxyphenyldiazonium-p-ethylphenyl sulfate, 4-N-phenylamino-2-methoxyphenyldiazonium-2-naphthyl sulfate, 4-N-phenylamino-2-methoxyphenyldiazonium-phenyl sulfate, 2,5-diethoxy-4-N-4'-methoxyphenylcarbonylphenyldiazonium-3-carboxy-4-hydroxyphenyl sulfate, 2-methoxy-4-N-phenylphenyldiazonium-3-carboxy-4-hydroxyphenyl sulfate, diphenylsulfonyl methane, diphenylsulfonyl diazomethane, diphenyl disulfone, α-methylbenzoin tosylate, pyrogallo trimesylate, benzoin tosylate, MPI-103 (CAS. NO. [87709-41-9]; Midori Kagaku Co., Ltd.), BDS-105 (CAS. NO. [145612-66-4]; Midori Kagaku Co., Ltd.), NDS-103 (CAS. NO. [110098-97-0]; Midori Kagaku Co., Ltd.), MDS-203 (CAS. NO. [127855-15-5]; Midori Kagaku Co., Ltd.), Pyrogallol tritosylate (CAS. NO. [20032-64-8]; Midori Kagaku Co., Ltd.), DTS-102 (CAS. NO. [75482-18-7]; Midori Kagaku Co., Ltd.), DTS-103 (CAS. NO. [71449-78-0]; Midori Kagaku Co., Ltd.), MDS-103 (CAS. NO. [127279-74-7]; Midori Kagaku Co., Ltd.), MDS-105 (CAS. NO. [116808-67-4]; Midori Kagaku Co., Ltd.), MDS-205 (CAS. NO. [81416-37-7]; Midori Kagaku Co., Ltd.), BMS-105 (CAS. NO. [149934-68-9]; Midori Kagaku Co., Ltd.), TMS-105 (CAS. NO. [127820-38-6]; Midori Kagaku Co., Ltd.), NB-101 (CAS. NO. [20444-09-1]; Midori Kagaku Co., Ltd.), NB-201 (CAS. NO. [4450-68-4]; Midori Kagaku Co., Ltd.), DNB-101 (CAS. NO. [114719-51-6]; Midori Kagaku Co., Ltd.), DNB-102 (CAS. NO. [131509-55-2]; Midori Kagaku Co., Ltd.), DNB-103 (CAS. NO. [132898-35-2]; Midori Kagaku Co., Ltd.), DNB-104 (CAS. NO. [132898-36-3]; Midori Kagaku Co., Ltd.), DNB-105 (CAS. NO. [132898-37-4]; Midori Kagaku Co., Ltd.), DAM-101 (CAS. NO. [1886-74-4]; Midori Kagaku Co., Ltd.), DAM-102 (CAS. NO. [28343-24-0]; Midori Kagaku Co., Ltd.), DAM-103 (CAS. NO. [14159-45-6]; Midori Kagaku Co., Ltd.), DAM-104 (CAS. NO. [130290-80-1] and CAS. NO. [130290-82-3]; Midori Kagaku Co., Ltd.), DAM-201 (CAS. NO. [28322-50-1]; Midori Kagaku Co., Ltd.), CMS-105 (Midori Kagaku Co., Ltd.), DAM-301 (CAS. NO. [138529-81-4]; Midori Kagaku Co., Ltd.), SI-105 (CAS. NO. [34694-40-7]; Midori Kagaku Co., Ltd.), NDI-105 (CAS. NO. [133710-62-0]; Midori Kagaku Co., Ltd.); EPI-105 (CAS. NO. [135133-12-9]; Midori Kagaku Co., Ltd.); and UVACURE1591(DAICEL UCB Co., Ltd.).

The content of the photopolymerization initiator may be determined depending on the acid-generating efficiency of the photopolymerization initiator to be employed and on the quantity of pigments to be incorporated in the ink. For example, when the content of the pigments is 5% by weight or so, the photopolymerization initiator can be generally incorporated at a ratio ranging from 1 to 20 parts by weight, more preferably from 3 to 10 parts by weight based on 100 parts by weight in total of the solvent. If the content of the photopolymerization initiator is less than one part by weight based on 100 parts by weight in total of the solvent, the sensitivity of the inkjet ink would be degraded. On the other hand, if the content of the photopolymerization initiator is higher than 20 parts by weight, the increase in viscosity with time of the ink would be intensified thereby degrading the coating properties of the ink and lowering the hardness of the ink film that has been photo-cured and at the same time, the erosion of the pipe line and printer head member of the printing apparatus would occur.

In addition to the photopolymerization initiator, it is also possible to employ a photo-radical generating agent in the inkjet ink.

As for the photo-radical generating agent useful in this case, it is possible to employ a photo-radical polymerization initiator such as Michler's ketone and benzophenone, which are available in the market as IRGACURE or DAROCURE (trade name; Nagase Sangyo Co., Ltd.). More specifically, the following compounds can be preferably employed. Namely, specific examples of the photo-radical generating agent include benzophenone, acetophenone derivatives such as α-hydroxy- or α-aminocetophenone, 4-aroyl-1,3-dioxorane, benzyl ketal, 2,2-diethoxyacetophenone, p-dimethyl aminoacetophenone, p-dimethyl aminopropiophenone, benzophenone, 2-chlorobenzophenone, pp'-dichlorobenzophenone, pp'-bisdiethyl aminobenzophenone, Michler's keton, benzyl, benzoin, benzyldimethyl ketal, tetramethyl thiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenylketone, 2-hydroxy-2-methyl-1-phenyl-1-on, 1-(4-isopropylphenyl)-2-hydroxy-2-methylpropane-1-on, methylbenzoyl formate, benzoin alkyl ether or ester such as benzoin isopropyl ether, benzoin methyl ether, benzoin ethyl ether, benzoin ether, benzoin isobutyl ether, benzoin n-butyl ether, and benzoin n-propyl; 1-hydroxy-cyclohexyl-phenyl ketone, 2-benzyl-2-dimethylamino-1-(4-morpholinophenyl)-butanone-1,1-dydroxy-cyclohexyl-phenyl-ketone, 2,2-dimethoxy-1,2-diphenylethan-1-on, bis($\eta^5$-2,4-cyclopentadien-1-yl)-bis(2,6-difluoro-3-(1H-pyrol-1-yl)-phenyl)titanium, bis(2,4,6-trimethylbenzoyl)-phenylphosphine oxide, 2-methyl-1[4-

(methylthio)phenyl]-2-morpholinopropan-1-on, 2-hydroxy-2-methyl-1-phenyl-propan-1-on (DAROCURE 1173), bis(2,6-dimethoxybenzoyl)-2,4,4-trimethyl-pentylphosphine oxide, 1-[4-(2-hydroxyethoxy)-phenyl]-2-hydroxy-2-methyl-1-propan-1-on monoacylphosphine oxide, bisacylphosphine oxide or titanocene, fluorescein, anthraquinone, thioxanthone or xanthone, lophine dimer, trihalomethyl compound or dihalomethyl compound, activated ester compound and orgnoboron compound. Furthermore, a photo-curing type radical generating agent such as bisdiazide compounds can be concurrently employed.

In addition to these photo-polymerization initiator and photo-radical generating agents, a sensitizer may be concurrently included in the ink in order to enhance the sensitivity that has been degraded due to the influence of absorption by pigments, etc. For example, it is possible to employ photosensitive dyes and as disclosed in U.S. Pat. No. 2,850,445; a composite sensitizer comprising a dye and amine (JP Patent Publication No. 44-20189 (1969); a combination comprising hexaaryl biimidazole, a radical generating agent and a dye (JP Patent Publication No. 45-37377 (1970); a system comprising hexaaryl biimidazole and p-dialkylaminobenzylidene ketone (JP Patent Publication No. 47-2528 (1972), JP Patent Laid-open Publication (Kokai) No. 54-155292 (1979); a system comprising a cyclic cis-α-dicarbonyl compound and a dye (JP Patent Laid-open Publication (Kokai) No. 48-84183 (1973)); a system comprising cyclic triazine and merocyanine pigment (JP Patent Laid-open Publication (Kokai) No. 54-151024 (1979)); a system comprising 3-ketocoumalin and an activating agent (JP Patent Laid-open Publications (Kokai) No. 52-112681 (1977) and No. 58-15503 (1983)); a system comprising biimidazole, styrene derivatives and thiol (JP Patent Laid-open Publication (Kokai) No. 59-140203 (1984)); a system comprising an organic peroxide and a pigment (JP Patent Laid-open Publications (Kokai) No. 59-140203 (1977) and No. 59-189340 (1983)); a system comprising a pigment having rhodanine skeleton and a radical generating agent (JP Patent Laid-open Publication (Kokai) No. 2-244050 (1990)); a system comprising titanocene and 3-ketocoumalin pigment (JP Patent Laid-open Publication (Kokai) No. 63-221110 (1988)); a system comprising a combination of titanocene, xanthene pigment and an addition-polymerizable ethylenic unsaturated compound having amino group and urethane group (JP Patent Laid-open Publications (Kokai) No. 4-221958 (1992) and No. 4-219756 (1992)); and a system comprising titanocene and a specific kind of merocyanine pigment (JP Patent Laid-open Publication (Kokai) No. 6-295061 (1994)). More specifically, it is possible to employ an amine-based sensitizer such as aliphatic amine, amine having an aromatic group, piperidine; an allyl-based sensitizer; a urea-based sensitizer such as o-tolylthiourea; sodium diethylene dithiophosphate; a soluble salt of aromatic sulfinic acid; N,N-di-substituted-p-aminobenzonitrile; tri-n-butylphosphine, sodium diethyldithiophosphide, Michler's ketone, N-nitrisohydroxyl amine derivatives, oxazolidine compounds, tetrahydro-1,3-oxazine compounds, condensates of formaldehyde or acetaldehyde and diamine, hexachloroethane, polymerized amine constituted by a reaction product of a resin and amine, triethanolamine triacrylate, etc.

The aforementioned sensitizers should preferably be employed at most to such an extent that would not cause any substantial change in color tone of the inkjet ink according to one embodiment of the present invention. Namely, the content of these sensitizers should preferably be limited at least not more than the equivalent weight of pigment or photo-radical generating agent.

Next, the inkjet recording method according to another embodiment of the present invention will be explained. The inkjet recording method according to the embodiment of the present invention is featured in that it employs a printing head and ink droplets are intermittently ejected from this printing head onto a substrate to record an image on the substrate, wherein the inkjet ink according to aforementioned the embodiment of the present invention is fed to the printing head while driving the printing head at a frequency of 4 kHz or more. Incidentally, the driving frequency mentioned in this specification means a delivery frequency of the ink of one dot. In a situation where the gradation in printing density is to be controlled by the number of droplets in printing one dot in a multi-drop system, a period of time starting from the moment when a plurality of droplets corresponding to one dot are delivered from the printing head up to the moment immediately before the delivery of the next dot is defined as one cycle in the delivery of ink. If this driving frequency is too low, the printing rate would become too slow, so that the printing head is driven at a frequency of 4 kHz or more in the recording method according to this embodiment of the present invention.

Incidentally, when the follow-up property of the liquid ink to the driving rate and the turbulence thereof are taken into account, the upper limit of this driving frequency would be 40 kHz or so in general. A plurality of nozzles for ejecting the ink are arranged in the printing head and the pore size of each of the nozzles is generally confined within the range of 10 μm to 100 μm or so, more preferably within the range of 30 to 50 μm or so. This printing head may be scanned in any manner relative to the surface of substrate such as paper. However, in order to accelerate the printing rate, the printing should be performed by unidirectionally scanning the printing head only once, in which case, the merit of the present invention will be most prominently exhibited.

In the case of the inkjet ink recording apparatus employed mainly in business where high-speed printing of large printing area is demanded, more severe ink delivery performance is demanded as compared with the printers for non-business use such as the printers for personal computers or for digital cameras. Especially, in the case of the unidirectional printing, the errors in delivering the ink would lead to the generation of unclear image as well as the generation of streaks due to missing of dots. Since it is impossible to remedy the missing of dots or streaks once they are generated, these defects will impose serious influences on the quality of printed matters. Whereas, the inkjet ink according to the embodiment of the present invention wherein the number of flocculates of pigment particles having a diameter of 1 μm or more is limited to a predetermined value can be suitably employed in such an inkjet recording method requiring a high-speed printing as described above.

FIG. 1 illustrates a schematic view of a recording apparatus to be employed in this case.

As shown in FIG. 1, the recording apparatus is provided with a recording medium carrying portion 2 formed of a carrier belt for carrying a recording medium 1. This recording medium carrying portion 2 is provided with a recording medium feeding portion 3 for feeding the recording medium 1. In a recording medium passageway 4 through which the recording medium 1 is transferred by the recording medium carrying portion 2, an inkjet recording head 5, and an ultraviolet irradiating apparatus 6 acting as an electromagnetic radiation irradiating portion are disposed successively, mentioning in the order from the location close to the recording medium feeding portion 3, along the moving route of the recording medium 1.

The recording medium carrying portion 2 is constituted by a recording medium transferring mechanism wherein a carrier belt 9 is wound around an interval between a driving roller 7 and a follower roller 8. The carrier belt 9 is rotatively moved through the rotation of the driving roller 7 to be driven by the motive power of driving source (not shown), thereby transferring the recording medium 1 placed on the carrier belt 9.

The recording medium feeding portion 3 is constructed to house a plurality of recording mediums 1 laminated one another and to pick up the recording medium 1 placed at the top of the laminated recording mediums, thus enabling this recording medium 1 to be transferred toward the recording medium carrying portion 2.

As described above, the inkjet recording head 5 is driven at a frequency of 4 kHz or more. The inkjet ink according to one embodiment of the present invention is fed to this inkjet recording head 5, which is formed of a line type head provided with a plurality of nozzles (not shown) arrayed linearly. Through these nozzles, the droplet of ink is enabled to selectively deliver during a single unidirectional scanning of the inkjet recording head 5, thus performing the printing. In this embodiment, there is no limitation with regard to the kinds of mechanism for ejecting the ink. This inkjet recording head 5 is disposed in such a way that an edge portion of the ink delivery side thereof faces the recording medium passageway 4.

The ultraviolet irradiating apparatus 6 is constructed such that it is equipped with a bulb 10 formed of an ultraviolet lamp such as a mercury lamp or a metal halide lamp and the light emitted from the bulb 10 can be irradiated, directly or after reflected by a reflecting plate 11, to the recording medium 1 being movingly carried on the recording medium passageway 4. In the case where an ultraviolet-curing type ink is employed and discharged onto the recording medium 1, the ultraviolet irradiating apparatus 6 for emitting ultraviolet rays is employed as an electromagnetic radiation irradiating portion.

Since the inkjet ink according to one embodiment of the present invention is regulated such that the number of flocculates of pigment particles having a diameter of 1 μm or more is confined to $1.6 \times 10^8/cm^3$ or less, it is possible to form a printed image of high quality which is free from unclear image and free from streaks as the inkjet ink is applied to the recording apparatus illustrated in FIG. 1.

The inkjet ink according to one embodiment of the present invention can be assessed according to the following method. Namely, this method of evaluating an inkjet ink is characterized as comprising the steps of: dispersing pigment particles having an average particle diameter of 250 nm or less in a solvent to prepare a pigment dispersion; coating the pigment dispersion on an impermeable substrate to prepare a sample to be measured; and observing the sample by using a microscope having a confocal optical system; wherein the sample is determined as acceptable provided that the number of pigment flocculate having a diameter of 1 μm or more and included in the sample is confined to $1.6 \times 10^8/cm^3$ or less.

A substance to be observed according to the aforementioned method is an flocculate of pigment particles, which reflects the dispersed state of pigment particles in an ink. As for the conventional means for observing particles of relatively large size, there are known an AccuSizer or a Coulter counter. In the employment of these means, the sample is required to be diluted, rendering the particle size to change, thereby making it impossible to accurately measure the state of flocculate. If an electronic microscope is to be employed, the observation is required to be performed on a simple substance of pigment. Whereas, according to the evaluation method as proposed according to the embodiment of the present invention, the observation can be performed on the ink itself or on a cured state of the ink, thereby making it possible to evaluate the dispersed state of pigment particles existing in an actual ink.

When a sample to be measured is diluted as conventionally practiced, the flocculates of pigment particles disperse or flocculate, so that it is impossible to accurately evaluate the dispersed state of pigment particles in the ink. Further, even if a light scattering method, a laser Doppler method or a centrifugal sedimentation method is employed, it is impossible to accurately observe a cluster of flocculates which are weakly bonded to each other or a gel-like flocculate. Therefore, these conventional methods are considered useless in accurately observing the state of coarse particles (flocculates of pigment particles) which has much to do with the ink delivery stability. Whereas, according to the method proposed according to the embodiment of the present invention, it is made possible to accurately observe the state of such flocculates, thereby making it possible to correctly evaluate the delivery stability of ink. Next, specific methods for measuring the state of flocculates will be explained.

At first, the pigment dispersion is prepared by dispersing a pigment having an average particle diameter of 250 nm or less in a solvent as described above. When the mixing ratio of the solvent is adjusted and then a polymerization initiator and other components for providing the pigment dispersion with any desired functions are added to the pigment dispersion so as to enable the pigment dispersion to function as an ink, the pigment dispersion can be defined as an ink. Whereas, when pigment particles are simply dispersed in or mixed with a solvent, this state of pigment dispersion can be defined as a precursor of ink.

As for the substrate on which a pigment dispersion is coated, various kinds of substrate including a printing medium can be employed. It is more preferable to employ a substrate having a smooth surface and being resistive to the permeation of ink such as a metal substrate, a glass substrate, a laminate consisting of a glass substrate on which a metal film is laminated, etc. A most preferable example of the substrate is a silicon substrate. With respect to the thickness of coated film of ink, it should preferably be confined to a thickness of several tens microns or less, more preferably about 1-2 μm for the convenience of observing the coated film as a measuring sample. The coated film can be formed by various methods including dipping, coating with a bar coater, coating with a spinner, and coating using an actual printing machine. Alternatively, a pigment dispersion may be simply dripped on a substrate for the observation thereof. Although the film thus coated may be cured by the irradiation of light or heating before the evaluation thereof for the convenience of observation, the coated film may be observed as it is without curing it.

The measuring sample thus created is observed to see the number of flocculates of pigment particles using a microscope provided with a confocal optical system. It is preferable to employ a confocal laser microscope available in the market, since it is possible to measure not only the distribution of particles in three-dimensional direction but also the number of particle existing in a specific volume. With respect to the wavelength of laser to be employed on this occasion, there is not any particular limitation as long as it is fundamentally that of visible light laser. In viewpoint of resolution, green-blue light (440-540 nm) is preferable. In this case, depending on the absorption wavelength of pigment, although a black or yellow pigment may be much easier to observe, it is also possible to make the observation on any color including cyan, magenta and others.

The sample to be measured is observed in a confocal mode using a microscope provided with a confocal optical system. The magnifications on this occasion should preferably be 1000 to 12000 times, more preferably 2000 to 5000 times. The range of visual field on this occasion would become 128×96 μm (×2000)–51×38 μm (×5000). The scanning (ordinary, 1 to several microns (μm)) is performed in the direction perpendicular to the plane of observation, thereby counting the number of flocculates per unit volume. With respect to the number of observation for each sample, although it is preferable to repeat the observation to such an extent that is reliable in statistical viewpoint, the observation of 5 to 10 points may be generally sufficient enough in view of the number of particles to be measured. For example, in the case of the measuring sample having a film thickness of 2 μm, when the observation is made in the range of 64×48 μm in visual field and the number of pigment flocculates having a diameter of 1 μm or more found in each visual field is one, the number of pigment flocculates per $cm^3$ in volume of ink would become $1.6×10^8/cm^3$. When the number of pigment flocculates having a diameter of 1 μm or more found after the observation of ten points is only one, the number of pigment flocculates per $cm^3$ in volume of ink would become $1.6×10^7/cm^3$.

In the evaluation method according to the embodiment of the present invention, the acceptable standard is set to $1.6×10^8/cm^3$ or less in the number of pigment flocculates having a diameter of 1 μm or more, so that the inkjet ink which satisfies this condition is recognized as being the inkjet ink according the embodiment of the present invention.

In the evaluation of the inkjet ink, only a portion of pigment dispersion may be used. The method of manufacturing the inkjet ink according to the embodiment of the present invention can be carried out based on or after this evaluation. First of all, according to the procedure described above, a sample to be measured is observed by using a microscope provided with a confocal optical system. When the number of pigment flocculate having a diameter of 1 μm or more was found to exceed $1.6×10^8/cm^3$, the rest of the pigment dispersion is further subjected to dispersion treatment. For this dispersion treatment, a dispersing apparatus such as a sand mill or a ball mill can be employed as already explained above. In this dispersion treatment, the number of pigment flocculate having a diameter of 1 μm or more is decreased to $1.6×10^8/cm^3$ or less, thus obtaining the inkjet ink according to the embodiment of the present invention.

As described above, the inkjet ink according to the embodiment of the present invention is excellent not only in ink delivery stability but also in storage stability. Therefore, it is possible, through the employment of this inkjet ink, to stably perform a high-speed printing of images of high quality.

Next, the present invention will be further explained in detail with reference to examples.

EXAMPLE 1

10 parts by weight of carbon black (FW18; Degussa Co., Ltd.) as a pigment and 8 parts by weight of a dispersing agent (Ajisper; Ajinomoto Finetechno Co., Ltd.) were added to isobornyl acrylate employed as a solvent, and the resultant mixture was subjected to a dispersing treatment for one hour in a sand mill and in a ball mill containing 0.3 μm zirconia beads.

To the liquid dispersion thus obtained, various liquid components were added so as to obtain a liquid mixture comprising 5% by weight of carbon black based on a total weight of the resultant mixture, and liquid components consisted of 40 wt % of isobornyl acrylate, 25 wt % of tripropyleneglycol diacrylate, 15 wt % of trimethylolpropane ethoxylate triacrylate, and 20 wt % of urethane acrylate (Highcope AU; Tokushiki Co., Ltd.). Further, IRGACURE (No. 2959; Nagase Sangyo Co., Ltd.) was added as a photo-radical generating agent to the mixture at a ratio of 5% based on the total weight of the resultant mixture. Finally, the resultant mixture was filtered using a 1 μm PTFE filter to obtain a black ink 1. The black ink 1 thus obtained was found to contain the pigment having an average particle diameter of 120 nm.

The black ink 1 thus prepared was dripped on a silicon substrate and then coated using a spinner. The coated layer was then allowed to cure by the irradiation of ultraviolet rays to form a coated film having a film thickness of 2 μm, which was then observed using a confocal microscope at a magnification of ×4000. The range of visual field in this case was 64 μm×48 μm. When this observation repeated 10 times while moving the visual field, the flocculate of pigment particles having a diameter of 1 μm or more was confirmed to exist only one in average at each visual field.

In order to investigate the ink delivery stability, the ink was subjected to a printing test. In this test, a printing head provided with about 300 of nozzles each having a pore size of 40 μm was used to perform printing wherein the delivery of ink was set to $5.5×10^9$ dots per hour. In doing so, the frequency in generation of printing error was investigated. As a result, the frequency in generation of printing error was found as being twice or so per hour.

COMPARATIVE EXAMPLE 1

A black ink 2 was prepared in the same manner as employed in Example 1 except that the dispersion treatment was performed using an ultrasonic head of 24 kHz and 600 W. An average particle diameter of the pigment contained in the black ink 2 was found 120 nm.

A coated film of the black ink 2 was formed according to the same procedure as described above and the resultant film was observed using a confocal microscope. The magnification, the range of visual field and the frequency of observation were made the same as Example 1. As a result, the flocculate of pigment particles having a diameter of 1 μm or more as confirmed to exist 10 in average at each visual field.

When the printing test was performed using this ink in the same manner as described above, the frequency in generation of printing error was found as being 40 times or so per hour.

EXAMPLE 2

A pigment dispersion was prepared according to the following formula.
Yellow pigment (PY-180)—10%
Dispersing agent (Solsperse 32000, Avecia Co., Ltd.)—3%
Dispersing agent (Solsperse 22000, Avecia Co., Ltd.)—0.3%
Solvent (Celloxide 3000 available from DAICEL Chemical Industries Ltd.)—86.7%

These materials were subjected to a dispersing treatment for two hours in a cyclic sand mill containing 0.5 mm beads. The resultant dispersion was made into an ink containing the pigment at a concentration of 5%. Then, 10 wt % (based on a total weight of the dispersion) of a photo-acid generating agent (ESACURE-1064; Lamberty Co., Ltd.) was added to the ink. Subsequently, the resultant ink was subjected to the irradiation of ultrasonic wave for 10 minutes by using an ultrasonic homogenizer to obtain a yellow ink 1. This yellow ink 1 was found as containing the pigment having an average particle diameter of 220 nm.

A coated film of this yellow ink 1 was formed according to the same procedure as described above and the resultant film was observed by using a confocal microscope. The magnification, the range of visual field and the frequency of observation were made the same as Example 1. As a result, the flocculate of pigment particles having a diameter of 1 μm or more was confirmed to exist 0.8 in average at each visual field.

When the printing test was performed using this ink in the same manner as described above, the frequency in generation of printing error was found as being 3 times per hour.

COMPARATIVE EXAMPLE 2

A yellow ink 2 was prepared in the same manner as employed in Example 2 except that the dispersion treatment was shortened to one hour. This yellow ink 2 was found as containing the pigment having an average particle diameter of 260 nm.

A coated film of the yellow ink 2 (Comparative Example 2-1) was formed according to the same procedure as described above and the resultant film was observed by using a confocal microscope. The magnification, the range of visual field and the frequency of observation were made the same as Example 1. As a result, the flocculate of pigment particles having a diameter of 1 μm or more was confirmed to exist 13 in average at each visual field.

When the printing test was performed using this ink in the same manner as described above, the frequency in generation of printing error was found as being 50 times or so per hour.

Further, the dispersion obtained after the dispersing treatment was subjected again to a dispersing treatment for 30 minutes in the sand mill. A portion of the resultant dispersion was made into an ink containing the pigment at a concentration of 5%. Subsequently, the resultant ink was subjected to the dispersing treatment by using an ultrasonic homogenizer to obtain a yellow ink of Comparative Example 2-2. This yellow ink of Comparative Example 2-2 was found as containing the pigment having an average particle diameter of 250 nm.

Furthermore, the dispersion obtained as described above was subjected again to a dispersing treatment for 30 minutes in the sand mill. A portion of the resultant dispersion was made into an ink containing the pigment at a concentration of 5%. Subsequently, the resultant ink was subjected to the dispersing treatment by using an ultrasonic homogenizer to obtain a yellow ink of Comparative Example 2-3. An average particle diameter of the pigment contained in the yellow ink of Comparative Example 2-3 was 230 nm.

A coated film of each of these inks was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 5 in average at each visual field in the case of the ink of Comparative Example 2-2, and one in average at each visual field in the case of the ink of Comparative Example 2-3.

When the printing test was performed using each of these inks in the same manner as described above, the frequency in generation of printing error was found as being 30 times or so per hour in the case of the ink of Comparative Example 2-2, and 10 times or so per hour in the case of the ink of Comparative Example 2-3.

EXAMPLE 3

By using a blue pigment (Hostaperm Blue), a pigment dispersion was prepared according to the following formula.
Blue pigment (Hostaperm Blue)—10%
Dispersing agent (Solsperse 32000, Avecia Co., Ltd.)—3%
Solvent (Celloxide 3000 available from DAICEL Chemical Industries Ltd.)—87%

These materials were subjected to a dispersing treatment for two hours in a cyclic sand mill containing 0.3 mm beads. The resultant dispersion was made into an ink containing the pigment at a concentration of 5%. Then, 10 wt % (based on a total weight of the dispersion) of a photo-acid generating agent (ESACURE-1064; Lamberty Co., Ltd.) was added to the ink. Subsequently, the resultant ink was filtrated using a 1 μm filter to eliminate giant particles to obtain a blue ink 1. An average particle diameter of the pigment contained in the blue ink 1 was 160 nm.

A coated film of this blue ink 1 was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 0.2 in average at each visual field.

When the printing test was performed using this ink in the same manner as described above, the frequency in generation of printing error was found as being twice per hour.

COMPARATIVE EXAMPLE 3

A blue ink 2 was prepared in the same manner as employed in Example 3 except that the filtration using a filter was not performed. An average particle diameter of the pigment contained in the blue ink 2 was 260 nm.

A coated film of the blue ink 2 was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 3 in average at each visual field.

When the printing test was performed using this ink in the same manner as described above, the frequency in generation of printing error was found as being 7 times or so per hour.

EXAMPLE 4

By using a magenta pigment (Pigment Red 122), a pigment dispersion was prepared according to the following formula.
Magenta pigment (Pigment Red 122)—10%
Dispersing agent (Solsperse 32000, Avecia Co., Ltd.)—3%
Solvent (Celloxide 3000 available from DAICEL Chemical Industries Ltd.)—87%

These materials were subjected to a dispersing treatment for two hours in a cyclic sand mill containing 0.3 mm beads. The resultant dispersion was made into an ink containing the pigment at a concentration of 5%. Then, 10 wt % (based on a total weight of the dispersion) of a photo-acid generating agent (ESACURE-1064; Lamberty Co., Ltd.) was added to the ink. Subsequently, the resultant ink was subjected to centrifugal separation (15000 G, 30 minutes) to eliminate giant particles to obtain a magenta ink 1. This magenta ink 1 was found as containing the pigment having an average particle diameter of 170 nm.

A coated film of this magenta ink 1 was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 0.6 in average at each visual field.

When the printing test was performed using this ink in the same manner as described above, the frequency in generation of printing error was found as being three times per hour.

COMPARATIVE EXAMPLE 4

A magenta ink 2 was prepared in the same manner as employed in Example 4 except that the elimination of giant particles by centrifugal separation was not performed. An average particle diameter of the pigment contained in the magenta ink 2 was 255 nm.

A coated film of the magenta ink 2 was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 15 in average at each visual field.

When the printing test was performed using this ink in the same manner as described above, the frequency in generation of printing error was found as being 55 times per hour.

EXAMPLE 5

By using a carbon black pigment (PBk7), a pigment dispersion was prepared according to the following formula.
Pigment (PBk7)—10%
Dispersing agent (Solsperse 32000, Avecia Co., Ltd.)—3%
Solvent (Celloxide 3000 available from DAICEL Chemical Industries Ltd.)—32%
Solvent (SR-NPG available from Sakamoto Yakuhin Co., Ltd.)—55%

These materials were subjected to a dispersing treatment for two hours in a cyclic sand mill containing 0.3 mm beads. The resultant dispersion was made into an ink containing the pigment at a concentration of 5%. Then, 10 wt % (based on a total weight of the dispersion) of a photo-acid generating agent (ESACURE-1064; Lamberty Co., Ltd.) was added to the ink. Subsequently, the resultant ink was subjected to centrifugal separation (15000 G, 30 minutes) to eliminate giant particles to obtain a black ink 3. This black ink 3 was found as containing the pigment having an average particle diameter of 130 nm.

A coated film of this black ink 3 was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 0.4 in average at each visual field.

When the printing test was performed using this ink in the same manner as described above, the frequency in generation of printing error was found as being twice per hour.

COMPARATIVE EXAMPLE 5

A black ink 4 was prepared in the same manner as employed in Example 5 except that the dispersing treatment time was shortened to one hour and the elimination of giant particles by centrifugal separation was not performed. An average particle diameter of the pigment contained in the black ink 4 was 200 nm.

A coated film of the black ink 4 was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 18 in average at each visual field.

When the printing test was performed using this ink in the same manner as described above, the frequency in generation of printing error was found as being 45 times per hour.

EXAMPLE 6

By using a carbon black pigment (PBk7), a pigment dispersion was prepared according to the following formula.
Pigment (PBk7)—10%
Dispersing agent (Solsperse 32000, Avecia Co., Ltd.)—3%
Solvent (SR-NPG available from Sakamoto Yakuhin Co., Ltd.)—55%
Solvent (Oxetane 221 available from Toa Gosei Co., Ltd.)—32%

These materials were subjected to a dispersing treatment for two hours in a cyclic sand mill containing 0.3 mm beads. The resultant dispersion was made into an ink containing the pigment at a concentration of 5%. Then, 10 wt % (based on a total weight of the dispersion) of a photo-acid generating agent (ESACURE-1064; Lamberty Co., Ltd.) was added to the ink. Subsequently, the resultant ink was subjected to centrifugal separation (15000 G, 30 minutes) to eliminate giant particles to obtain a black ink 5. This black ink 5 was found as containing the pigment having an average particle diameter of 110 nm.

A coated film of this black ink 5 was formed according to the same procedure as described above and the resultant film was observed using a confocal microscope. The magnification, the range of visual field and the frequency of observation were made the same as Example 1. As a result, the flocculate of pigment particles having a diameter of 1 μm or more was confirmed to exist 0.1 in average at each visual field.

When the printing test was performed using this ink in the same manner as described above, the frequency in generation of printing error was found as being only once per hour.

COMPARATIVE EXAMPLE 6

A black ink 6 was prepared in the same manner as employed in Example 6 except that the dispersing treatment time was shortened to 30 minutes and the elimination of giant particles by centrifugal separation was not performed. An average particle diameter of the pigment contained in the black ink 6 was of 210 nm.

A coated film of the black ink 6 was formed according to the same procedure as described above and the resultant film was observed by using a confocal microscope. The magnification, the range of visual field and the frequency of observation were made the same as Example 1. As a result, the flocculate of pigment particles having a diameter of 1 μm or more was confirmed to exist 20 in average at each visual field.

When the printing test was performed using this ink in the same manner as described above, the frequency in generation of printing error was found as being 50 times per hour.

The number of the flocculates of pigment particles, the frequency of printing error in the aforementioned examples and comparative examples are summarized together with the average particle diameter of pigment particles in the following Table 1.

TABLE 1

| | | Average particle diameter (nm) | Number of pigment flocculates (average) | Printing error (frequency/h) |
|---|---|---|---|---|
| Ex. | 1 | 120 | 1 | 2 |
| | 2 | 220 | 0.8 | 3 |
| | 3 | 160 | 0.2 | 2 |
| | 4 | 170 | 0.6 | 3 |
| | 5 | 130 | 0.4 | 2 |
| | 6 | 110 | 0.1 | 1 |
| Comp. Ex. | 1 | 120 | 10 | 40 |
| | 2-1 | 260 | 13 | 50 |
| | 2-2 | 250 | 5 | 40 |
| | 2-3 | 230 | 1 | 40 |
| | 3 | 260 | 3 | 7 |
| | 4 | 255 | 15 | 55 |
| | 5 | 200 | 18 | 45 |
| | 6 | 210 | 20 | 50 |

As shown in the above Table 1, since the inkjet inks according to the examples of the present invention were regulated such that the average particle diameter of pigment was confined to 250 nm or less and the number of flocculates of pigment particles having a diameter of 1 μm or more was confined to $1.6 \times 10^8/\text{cm}^3$ or less, it was possible to minimize the frequency of generating printing error and to obtain printings of high quality.

Whereas, in the cases where any one of the conditions regarding the average particle diameter and the number of flocculates of pigment particles was not satisfied, it was impossible to suppress the generation of printing error and to obtain printed images of high quality as clearly indicated by the results of Comparative Examples.

EXAMPLE 7

In an attempt to investigate the dispersion stability and the decrease of surface tension of the ink employed in Example 1, a metal salt of organic acid (calcium stearate) was employed as a surfactant and gradually added to the ink to observe the number of flocculates of pigment particles generated in this experiment. As a result, it was found out that although little change was recognized in the number of flocculates of pigment particles until the concentration of calcium stearate was increased up to 0.5%, when the concentration of calcium stearate was increased excessively to 1%, the number of flocculates of pigment particles was considerably increased to 15 at each visual field. The frequency of printing error on this occasion was also increased to 40 times per hour. When the concentration of calcium stearate was further increased excessively to 2%, the number of flocculates of pigment particles was proportionally increased to 32 at each visual field and the frequency of printing error was also increased to 90 times per hour, thus indicating the correlation between the frequency of printing error and the number of flocculates of pigment particles.

These results obtained from Example 7 clearly indicate the correlation between the frequency of printing error and the number of flocculates of pigment particles in addition to the results shown in Table 1.

What is claimed is:

1. An inkjet ink comprising:
    an organic solvent, at least 90% by weight of the organic solvent being a polymerizable monomer;
    a pigment having an average particle diameter of 250 nm or less; and
    a photopolymerization initiator,
    wherein the number of flocculates of pigment particles having a diameter of 1 μm or more is $1.6 \times 10^8/\text{cm}^3$ or less.

2. The inkjet ink according to claim 1, wherein the number of flocculates of pigment particles is $1.6 \times 10^7/\text{cm}^3$ or less.

3. The inkjet ink according to claim 1, wherein the flocculates of pigment particles is confirmed through the observation of a coated film and/or cured matter of the inkjet ink using a microscope having a confocal optical system.

4. The inkjet ink according to claim 1, wherein a total concentration of solid matters in the solvent is at least 3% by weight, and a viscosity in ordinary temperature of the solvent is within the range of 6 to 50 mPa·sec.

5. The inkjet ink according to claim 1, wherein the number of flocculates of pigment particles having a diameter of 5 μm or more is $1.6 \times 10^6/\text{cm}^{53}$ or less.

* * * * *